(Model.)
H. T. MOODY
DOOR HANGER.
No. 281,546. Patented July 17, 1883.
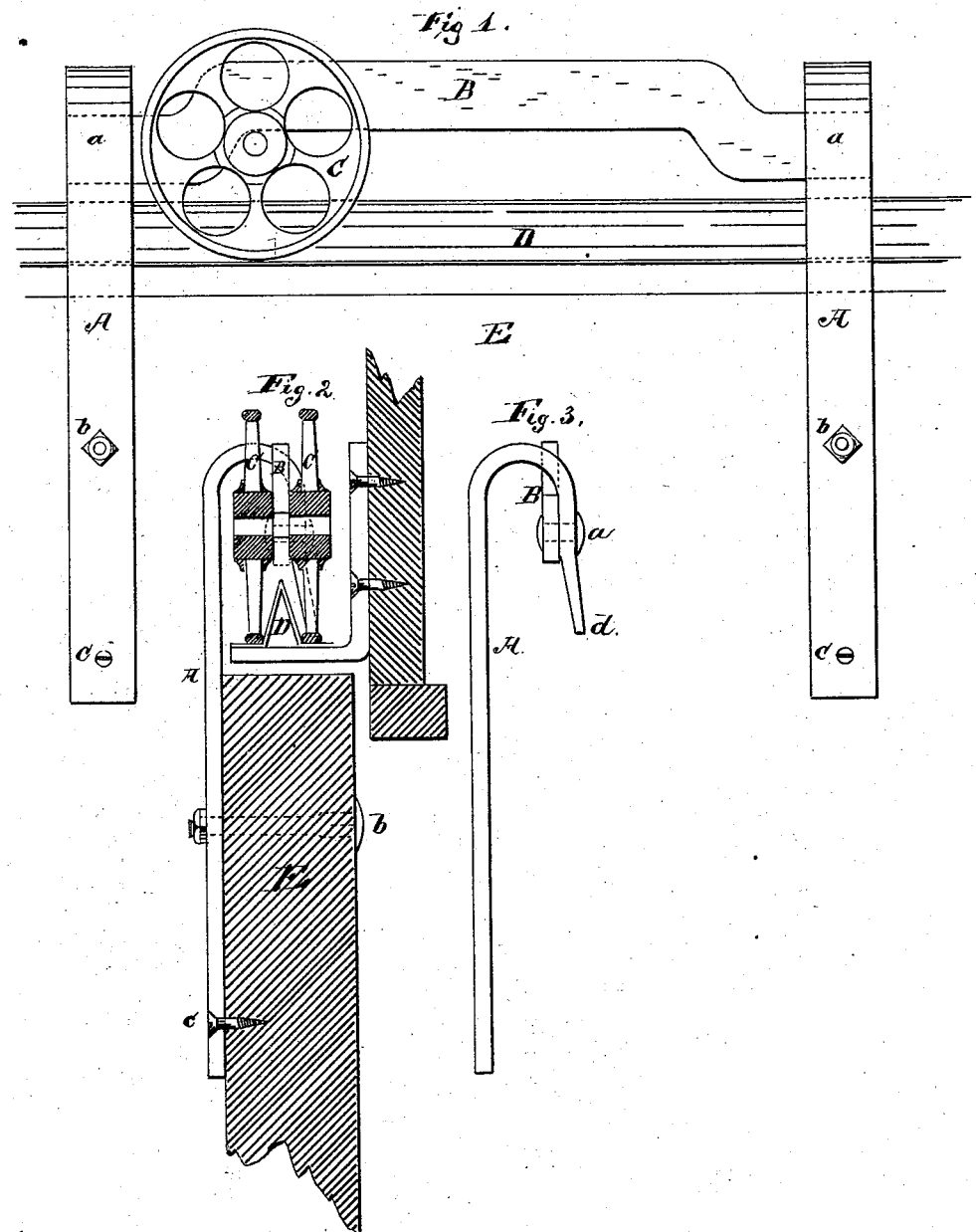
Witnesses:
Albert E. Johnson.
Herbert Currier.
Inventor
Henry T. Moody

UNITED STATES PATENT OFFICE.

HENRY T. MOODY, OF NEWBURYPORT, MASSACHUSETTS, ASSIGNOR OF ONE-HALF TO IRVIN BESSE, OF SAME PLACE.

DOOR-HANGER.

SPECIFICATION forming part of Letters Patent No. 281,546, dated July 17, 1883.

Application filed April 4, 1883. (Model.)

*To all whom it may concern:*

Be it known that I, HENRY T. MOODY, of Newburyport, in the county of Essex, and in the State of Massachusetts, have invented certain new and useful Improvements in Door-Hangers; and I do hereby declare that the following is a full, clear, and exact description thereof, reference being had to the accompanying drawings.

The invention has for its object the perfect security of the door, compactness, strength, and ease of motion, and the novel arrangement of parts, so as to be easily constructed wholly or in a large degree of wrought metal, as described hereinafter, and pointed out in the claim.

In the accompanying drawings, Figure 1 represents a view of my appliance in perspective. Fig. 2 represents an inside view of a vertical transverse section of the invention, and Fig. 3 represents an end elevation of a part of my improvement.

The letter A indicates the metallic plates connecting the upper rider-bar, B, to the door, and having downward projections d, that act as both track-clearers and guides, to prevent the lateral swinging of the door, and also to prevent its derailment.

The letter B indicates the rider-bar, formed as shown, to limit the wheel C in its longitudinal motion as the door is moved, and to also bring the center of draft nearly on a line with the axle of the wheel C, this track being secured to the plates A, as best shown in Fig. 3, and constructed to pass freely between the inner hub-flanges of the wheel C and rest on its axle.

The letter C indicates the metal wheel, so constructed as to give easy passage to the rider-bar B between its inner hub-flanges, and having a small hard-metal axle to sustain the weight of the door, and constructed to admit of the passage of the inverted-V-shaped track D, extended well between its flanges, near the base, with gradual taper toward the apex, as shown.

The letter D represents an important portion of my invention—the track-rail, on the flanges of which the wheel C travels on its periphery during the motion of the door, and shaped to extend nearly to the hub of the wheel C on an angle having one line nearly parallel with the projections d.

The inverted flanged V-shaped track D may be attached to brackets, as shown, or to any other fixture over the door, to prevent the rising of the door to any considerable extent.

In applying my invention two or more of the wheels and the attachments are used, being fastened to the door as shown by letters b and c, or in any other suitable manner.

What I claim as new, and desire to secure by Letters Patent, is—

In combination, the plates A A, having projections d d, connected by the rider-bar B, the track-rail D, and wheel C, all shaped, combined, and operated in the manner and for the purpose specified.

HENRY T. MOODY.

Witnesses:
  EDWARD B. BROWN,
  IRVIN BESSE,
  ORIGEN C. BRADLEY.